3,119,864
HALOALKYL SUBSTITUTED BORAZINES
Amos J. Leffler, Wayland, Mass., assignor to Stauffer Chemical Company, New York, N.Y., a corporation of Delaware
No Drawing. Filed Jan. 3, 1961, Ser. No. 80,042
2 Claims. (Cl. 260—551)

This invention relates to haloalkyl substituted borazines and the process of producing the same.

Heretofore, N-substituted borazines have been prepared by the following reactions:

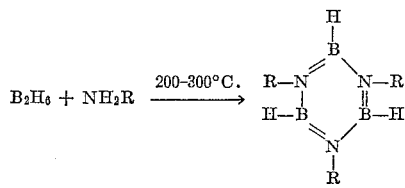

and

LiBH$_4$RNH$_3$Cl→ [RNBH]$_3$+9H$_2$+3LiCl

However, in none of the literature is there to be found a haloalkyl substituted borazine nor processes for the preparation of the same.

By the present invention, it has been found that haloalkyl substituted borazines can readily be prepared from halogenated starting materials.

More specifically, it has been found that halogenated nitriles or halogenated amidines can be reacted with diborane to produce haloalkyl substituted borazines. This reaction may be expressed as follows:

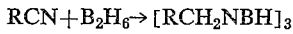
RCN+B$_2$H$_6$→ [RCH$_2$NBH]$_3$ or;

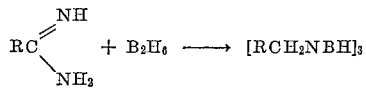

wherein R is a halogenated hydrocarbon radical which can be partially or completely halogenated and can contain mixed fluoro and chloro groups. The halogenated hydrocarbon radical may contain one or more carbon atoms. For example, the starting materials used, may include CF$_3$CN, CF$_2$Cl—CN, CF$_2$H—CCl$_2$—CN, CH$_2$Cl—C$_2$H$_4$—CN C$_3$Cl$_7$CN or the equivalent amidines.

When either the halogenated nitrile or amidine is mixed with diborane at room temperature in the absence of a solvent, no reaction occurs. But, when such mixed reactants are heated, the desired product will be obtained. However, when chlorinated starting materials are used, violent explosions frequently result due to the reduction of the chlorine-carbon bond by the hydride hydrogen.

It has also been found that the above reaction will proceed readily at room temperature merely by passing the reactants into the reaction vessel at the desired rate if an ether with which diborane forms a complex is used as a solvent. Examples of such ethers are dimethoxyethane and diethyleneglycol dimethyl ether. Use of such a solvent also negates the possibility of explosions when chlorinated starting materials are used.

The product obtained by this reaction is an intermediate compound, RCH=NBH$_2$, wherein the R is halogenated. In order to obtain a haloalkyl substituted borazine, the intermediate compound must be heated. Again, if the intermediate is heated in the dry state there is danger of an explosion. The ether solvent used in the first step of the reaction, however, is not satisfactory because the final product is soluble therein and must be separated.

For this reason, it has been found more satisfactory to use an inert solvent in which the haloalkyl substituted borazine is insoluble. Any high boiling inert hydrocarbon solvent could be used as the inert solvent. After heating the intermediate and the inert solvent, the reaction mixture is cooled, the haloalkyl substituted borazine separates out and is filtered and washed with a volatile solvent to obtain a highly pure product.

This method is especially applicable to volatile reactants which must be handled in a vacuum system in the absence of a solvent. CF$_3$CN boils at −59° C. and B$_2$H$_6$ boils at −92° C. In order to react these compounds in the absence of a solvent a sealed tube must be used and obviously this is inconvenient. However, if an ether such as dimethoxyethane is used, they will react exothermically merely by passing them into the ether at room temperature at the proper rate.

When CCl$_3$CN reacts with B$_2$H$_6$ in the absence of a solvent, explosions have frequently resulted when the temperature was held at 90 to 100° C. Again CCl$_3$CN and B$_2$H$_6$ readily react in dimethoxyethane at room temperature. In both of these cases, the CCl$_3$CN and the CF$_3$CN reacted to form the intermediate compound, RCH=NBH$_2$ wherein the R is halogenated.

The conversion of this intermediate to the final product in the case of CCl$_3$CH=NBH$_2$ must be done without local overheating. When a quantity of this material was heated dry in a sealed vessel, a violent explosion took place. However, in an inert solvent the reaction proceeded without difficulty and the product separated out on cooling, was filtered off, washed, dried, and collected.

These and another haloalkyl substitued borazines have been tested and found to have good mildew preventive properties. They also have been found to be severely phytotoxic and their commercial use as agriculture chemicals is possible.

The following are illustrative examples of the present invention.

*Reaction of* CCl$_3$CN *and* B$_2$H$_6$

In a 500 ml. 3 neck flask equipped with a gas inlet tube, stirrer, and a condenser, 57 grams of CCl$_3$CN and 200 ml. of dimethoxyethane were placed. The flask was swept with dry nitrogen and diborane was admitted. The reaction mixture grew warm and the rate of diborane introduction was controlled in order to prevent too high a temperature. The rate of diborane introduction was held at about 30 ml. per minute. The end of the reaction was indicated by a fall of the temperature within the flask. After carefully purging the reaction mixture with nitrogen, the flask was arranged for distillation and the solvent was removed under water aspirator pressure. The slurry remaining was washed with 30–60° petroleum ether to remove the remaining solvent and leave a fine white powder. The product weighed 38 grams which was 62% of the theoretical yield. It was found that the product, which melted at 116° C., could be sublimed at 110–120° C. in a vacuum. The analysis for CCl$_3$CH=NBH$_2$, which theoretically is C—15.15, N—8.85, Cl—67.30, B—6.85, and H—1.898, found C—15.00, N—8.61, Cl—67.03, B—6.55, and H—1.87.

In order to determine the number of hydrolyzable hydrogen atoms on the adduct a freshly prepared sample was reacted with methanol. A sample of 0.1735 grams (1.20 m.moles) of CCl$_3$CN in 5 ml. of dimethoxyethane was reacted with 1.625 m.moles of diborane in a 50 ml. flask attached to a vacuum system. After the reaction was complete all of the volatiles were removed and excess methanol condensed into the product. The hydrogen generated was measured in the Toepler pump and was found to be 2.275 m.moles. This gives a ratio of H$_2$/CCl$_3$CN of 1.895 which clearly shows two hydride hydrogen atoms per molecule and thus, confirms the formula $CCl_3CH=NBH_2$.

The conversion of the intermediate material $$CCl_3CH=NBH_2$$

into the trimer was found to be possible on a small scale by heating in a sealed tube. However, a 30 gram sample heated in this way exploded violently. If the adduct is suspended in Amsco Odorless Mineral Spirits the heating at 140° C. for 2 hours goes smoothly to yield the borazine in larger quantities. The product melts at 202–3° C. and had measured molecular weights of 468, 478, and 484 against a theoretical of 474.15. It sublimed at 130° C. in vacuo. The yield from 20.9 grams of adduct was 11.4 grams which is 54.5% of the theoretical yield. The analysis for $[CCl_3CH_2NBH]_3$, which theoretically is C—15.15, N—8.85, Cl—67.30, B—6.85, and H—1.898, was found to be C—15.21, N—8.61, Cl—67.16, B—7.00, and H—2.01.

Reaction of $CF_3CN$ and $B_2H_6$

A. In Diethyl Ether

A mixture of 3.90 m.moles of $CF_3CN$ and 1.76 m.moles of $B_2H_6$ was dissolved in 5 ml. of $Et_2O$ in a 50 ml. flask with a magnetic stirrer attached to the vacuum system. No reaction took place during one hour at room temperature. However, when 1 ml. of dimethoxyethane was distilled into the reaction flask a slow reaction took place at room temperature showing that dissociation of the diborane is a necessary step in the reaction mechanism.

B. In Dimethoxyethane

In a 500 ml. neck flask equipped with a stirrer, two gas inlet tubes, and a Dry Ice cooled reflux condenser was placed 100 ml. of dimethoxyethane. The flask was flushed with dry nitrogen and the $CF_3CN$ and diborane fed into the solution in a 2:1 ratio as determined by rotameters. The reaction grew warm as it progressed over a three hour period. In all, 33 grams of $CF_3CN$ were used.

At the conclusion of the reaction, the system was purged with nitrogen and the solvent removed. The remaining liquid was transferred to a small distillation apparatus and the final traces of solvent were removed. The liquid was then distilled under reduced pressure. The following fractions were obtained:

| Fractions | Amounts (grams) | Boiling Point (° C.) |
| --- | --- | --- |
| I | 2.8 | 90 at atm. press. |
| II | 1.5 | 55–106 at 92 mm. press. |
| III | 6.5 | 106–111 at 92 mm. press. |
| IV | 2.0 | 100 at 32 mm. press. |

Fractions I and II were the solvent and contaminated solvent while Fraction III was the borazine which crystallized on cooling. Fraction IV was also the borazine and a viscous oily residue remained that slowly became solid on cooling.

Analysis of Fraction III for $[CF_3CH_2NBH]_3$, which theoretically is C—22.10, N—12.90, F—52.5, B—9.98, and H—2.76, was found to be C—21.36, N—12.08, F—53.67, B—9.74, and H—2.20. The molecular weight of the borazine in boiling benzene was found to be 332 against the theoretical molecular weight of 327.15. The material is also slowly hydrolyzed by moisture although not soluble in water and it reacts with methanol to evolve hydrogen.

Analysis of the residue showed C—19.11, N—9.72, F—38.03, B—9.89, and H—3.18, and a total of 79.93. The lack of closure may be due either to analytical error or to oxygen.

The initial sample of the residue was a very viscous liquid that was soluble in common organic solvents and had a molecular weight of 832 in boiling benzene. After being heated for 3 hours at 200° C. under nitrogen the molecular weight was found to be 1350. It should be noted that this is a number average molecular weight and any solvent occlusion would greatly lower the value. After heating, the material was a low melting solid that could be pulled out into filaments.

The above are merely examples of the invention and should not be construed in any way so as to limit the invention as defined in the appended claims.

I claim:

1. A composition of matter the formula:

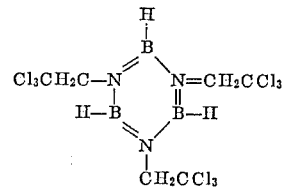

2. A composition of matter of the formula:

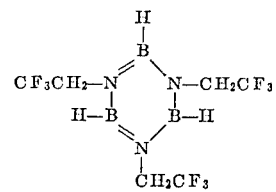

References Cited in the file of this patent

UNITED STATES PATENTS 3,008,988    Winternitz et al.          Nov. 14, 1961

OTHER REFERENCES

Schechter et al.: Boron Hydrides and Related Compounds (a Treatise), page 103, January 8, 1951.